US010837491B2

(12) United States Patent
Takahashi et al.

(10) Patent No.: US 10,837,491 B2
(45) Date of Patent: Nov. 17, 2020

(54) MULTI-ROW ROLLING ELEMENT HOUSING BAND AND MOTION GUIDE APPARATUS

(71) Applicant: THK CO., LTD., Tokyo (JP)

(72) Inventors: Toru Takahashi, Tokyo (JP); Yoshihiro Hamada, Tokyo (JP); Ryuichi Yamakoshi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/612,844

(22) PCT Filed: May 14, 2018

(86) PCT No.: PCT/JP2018/018474
§ 371 (c)(1),
(2) Date: Nov. 12, 2019

(87) PCT Pub. No.: WO2018/216519
PCT Pub. Date: Nov. 29, 2018

(65) Prior Publication Data
US 2020/0200217 A1     Jun. 25, 2020

(30) Foreign Application Priority Data
May 23, 2017   (JP) .................................. 2017-101423

(51) Int. Cl.
 F16C 29/06     (2006.01)
 F16C 29/00     (2006.01)
(52) U.S. Cl.
 CPC ...... *F16C 29/0609* (2013.01); *F16C 29/0647* (2013.01); *F16C 29/005* (2013.01);
(Continued)

(58) Field of Classification Search
 CPC .............. F16C 29/0609; F16C 29/0611; F16C 29/0645; F16C 29/0647; F16C 29/065;
(Continued)

(56) References Cited

U.S. PATENT DOCUMENTS

| 9,194,428 B2 * | 11/2015 | Geka .................. F16C 29/0666 |
| 2003/0185470 A1 * | 10/2003 | Lee ..................... F16C 33/3825 384/45 |
| 2015/0159695 A1 | 6/2015 | Geka et al. |

FOREIGN PATENT DOCUMENTS

| EP | 1953401 A2 * | 8/2008 | ............. F16C 33/40 |
| JP | 2-65713 U | 5/1990 | |

(Continued)

OTHER PUBLICATIONS

International Search Report dated Jul. 24, 2018, issued in counterpart application No. PCT/JP2018/018474 (1 page).

(Continued)

*Primary Examiner* — Phillip A Johnson
(74) *Attorney, Agent, or Firm* — Westerman, Hattori, Daniels & Adrian, LLP

(57) ABSTRACT

A multi-row rolling element housing band is provided which can promote an increase in the degree of precision of a guide. At least three rolling element rows (17) to (19) are arranged in a band (15). Each second rolling element (18a) of the second rolling element row (18) is displaced by P/n in a length direction of the band (15) from each first rolling element (17a) of the first rolling element row (17). Each third rolling element (19a) of the third rolling element row (19) is displaced by P/n in the length direction of the band (15) from each second rolling element (18a) of the second rolling element row (18). P is the pitch between the first rolling elements (17a), and n is the number of rows.

17 Claims, 15 Drawing Sheets

(52) U.S. Cl.
CPC .......... *F16C 29/008* (2013.01); *F16C 29/065* (2013.01); *F16C 2240/80* (2013.01)

(58) Field of Classification Search
CPC .............. F16C 29/0661; F16C 29/0664; F16C 29/0666; F16C 29/0671; F16C 29/0673
See application file for complete search history.

(56) References Cited

FOREIGN PATENT DOCUMENTS

| | | |
|---|---|---|
| JP | 2008-249043 A | 10/2008 |
| JP | 2011-112069 A | 6/2011 |
| JP | 2014-55670 A | 3/2014 |

OTHER PUBLICATIONS

Notification of Reasons for Refusal dated Jan. 8, 2019, issued in counterpart JP Application No. 2017-101423, w/ English translation (7 pages).
Decision to Grant a Patent dated May 7, 2019, issued in counterpart JP Application No. 2017-101423, w/English translation (6 pages).
Office Action dated May 7, 2020, issued in counterpart CN Application No. 201880034171.2, with English Translation. (10 pages).

\* cited by examiner

FRONT ←→ REAR

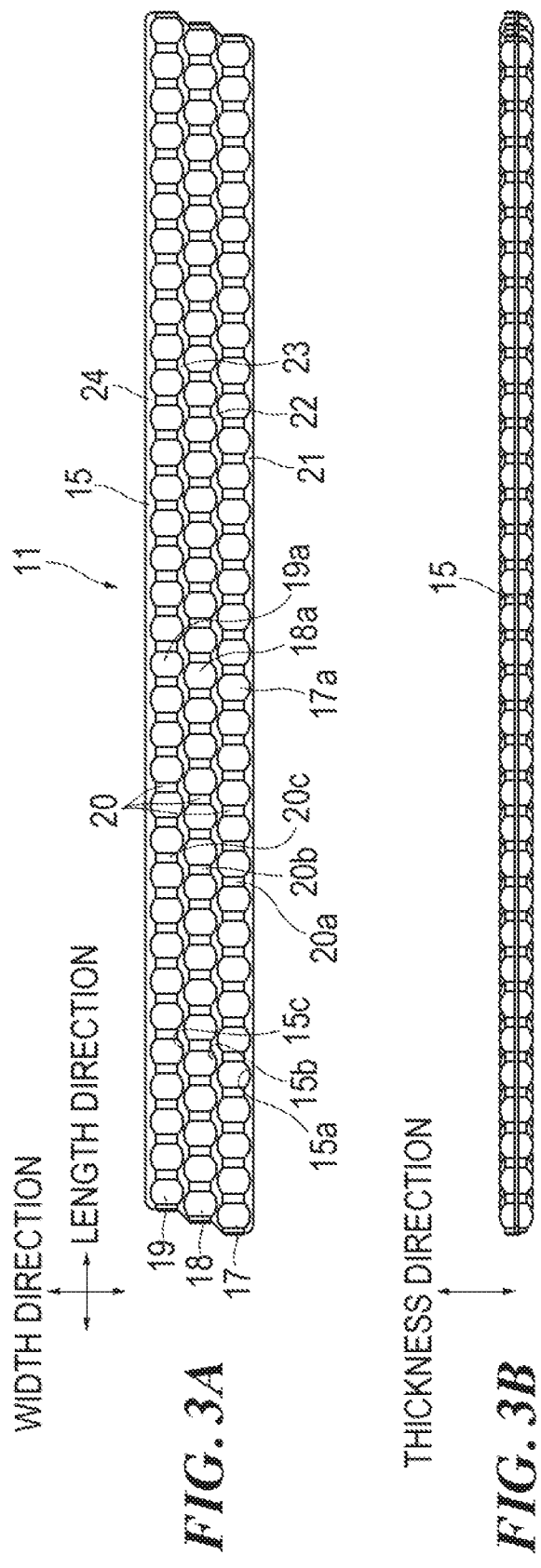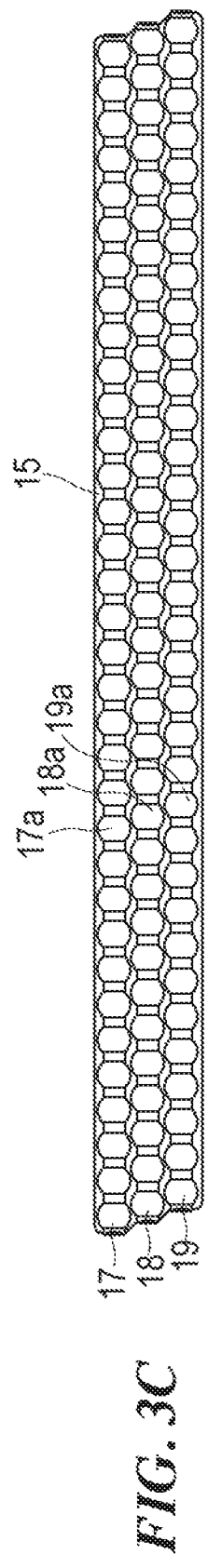

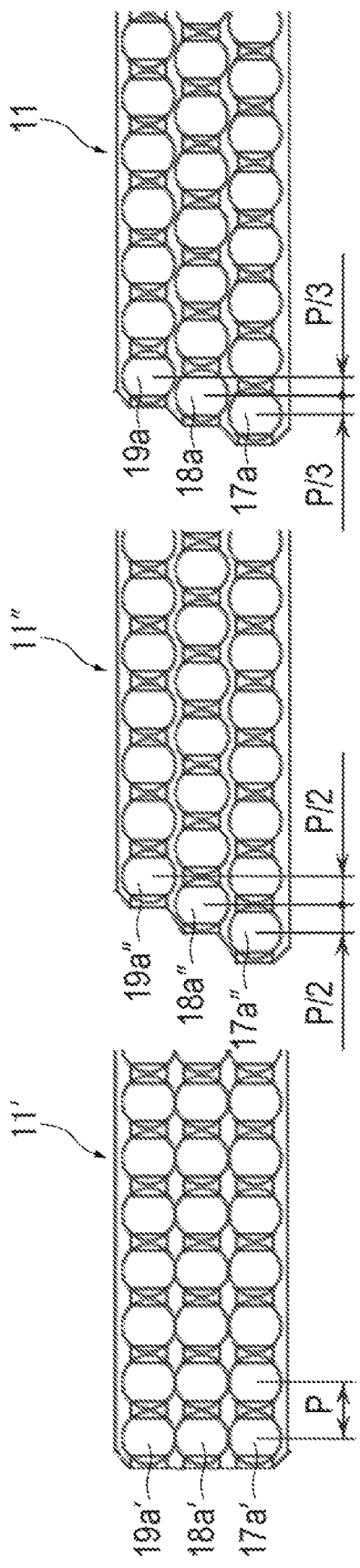


MULTI-ROW ROLLING ELEMENT HOUSING BAND AND MOTION GUIDE APPARATUS

TECHNICAL FIELD

The present invention relates to a multi-row rolling element housing band integrated into a circulation path of a carriage of a motion guide apparatus, and a motion guide apparatus.

BACKGROUND ART

A motion guide apparatus guides the motion of a moving body such as a table, using the rolling motion of rolling elements such as balls or rollers. The motion guide apparatus includes a guide rail, and a carriage that moves relatively along the guide rail. A plurality of rolling elements such as balls or rollers are disposed between the guide rail and the carriage in such a manner as to be capable of rolling motion. The carriage is provided with a circulation path where the rolling elements circulate. When the carriage moves relatively along the guide rail, the rolling elements circulate in the circulation path.

The rolling elements rolling between the guide rail and the carriage roll in the same direction. In order to prevent preceding and following rolling elements in the travel direction rubbing against each other and hindering smooth rolling of the rolling elements, a rolling element housing band has been proposed in which spacers are disposed between the rolling elements and the spacers are coupled in a chain by a band (refer to Patent Literature 1).

CITATION LIST

Patent Literature

Patent Literature 1: JP 2008-249043 A

SUMMARY OF INVENTION

Technical Problem

A rolling guide using rolling motion of rolling elements has an advantage that the guide has a higher rigidity than a hydrostatic guide, that is, a system that supplies a fluid such as oil to a guide surface, floats a moving body, and guides the moving body using a low viscosity of the fluid. Hence, in recent years, rolling guides are also replacing hydrostatic guides in machines such as precision processing machines, high-precision machining centers, and semiconductor manufacturing apparatuses. How precise a moving body is guided becomes an issue in using a rolling guide apparatus in such a machine.

If the diameter of a rolling element is reduced, and the number of rolling elements between a guide rail and a carriage is increased, then it can be deemed as if the rolling elements are a layer of oil of a hydrostatic guide. An increase in the degree of precision of a guide can be promoted. However, there is a limit to a reduction in the diameter of a rolling element in terms of manufacture.

Hence, an object of the present invention is to provide a multi-row rolling element housing band where an increase in the degree of precision of a guide can be promoted, and a motion guide apparatus where the multi-row rolling element housing band is integrated.

Solution to Problem

In order to solve the above problem, an aspect of the present invention is a multi-row rolling element housing band where at least three rolling element rows are arranged in a band, and in at least a part of the band in a length direction thereof, each of second rolling elements of a second rolling element row is displaced in the length direction of the band from each of first rolling elements of a first rolling element row, and each of third rolling elements of a third rolling element row is displaced in the length direction of the band from each of the first rolling elements and each of the second rolling elements.

Another aspect of the present invention is a motion guide apparatus including: a guide rail; a carriage assembled to the guide rail in such a manner as to be movable relative to the guide rail; and a multi-row rolling element housing band integrated into a circulation path of the carriage, in which as viewed from a front of the carriage in a state where the motion guide apparatus is placed on a horizontal plane, the carriage is provided with four circulation paths in total, that is, two upper and lower circulation paths on each of the left and right sides, the multi-row rolling element housing band is integrated into each circulation path, two rolling element rows are arranged in the multi-row rolling element housing band, and in at least a part of the multi-row rolling element housing band in a length direction thereof, each of second rolling elements of a second rolling element row is displaced in the length direction of the multi-row rolling element housing band from each of first rolling elements of a first rolling element row in a state where a spacer is disposed between the first rolling elements, the spacer is disposed between the second rolling elements, and the first and second rolling elements are made noncontact.

Advantageous Effects of Invention

According to the present invention, rolling elements of each rolling element row do not overlap completely as viewed in a width direction of a band. Accordingly, it can be deemed as if the number of rolling elements contributing to a reduction in waving of a carriage has increased. Therefore, it is possible to promote a reduction in the waving of the carriage, and by extension an increase in the degree of precision of a guide.

BRIEF DESCRIPTION OF DRAWINGS

FIGS. 3A to 3D are four orthogonal views of a ball retainer of the first embodiment of the present invention (FIG. 3A is a plan view, FIG. 3B is a front view, FIG. 3C is a bottom view, and FIG. 3D is a left side view).

FIGS. 14A to 14C are plan views of retainers used for analysis (FIG. 14A is a first comparative example, FIG. 14B is a second comparative example, and FIG. 14C is an example of the present invention).

DESCRIPTION OF EMBODIMENTS

Embodiments of a multi-row rolling element housing band of the present invention are described hereinafter on the basis of the accompanying drawings. However, the multi-row rolling element housing band of the present invention can be embodied in various forms, and is not limited to the embodiments described in the description. The embodiments are provided with the intention of enabling those skilled in the art to fully understand the scope of the invention by fully disclosing the description.

(Multi-Row Rolling Element Housing Band of First Embodiment and Motion Guide Apparatus of First Embodiment)

Figure 1:
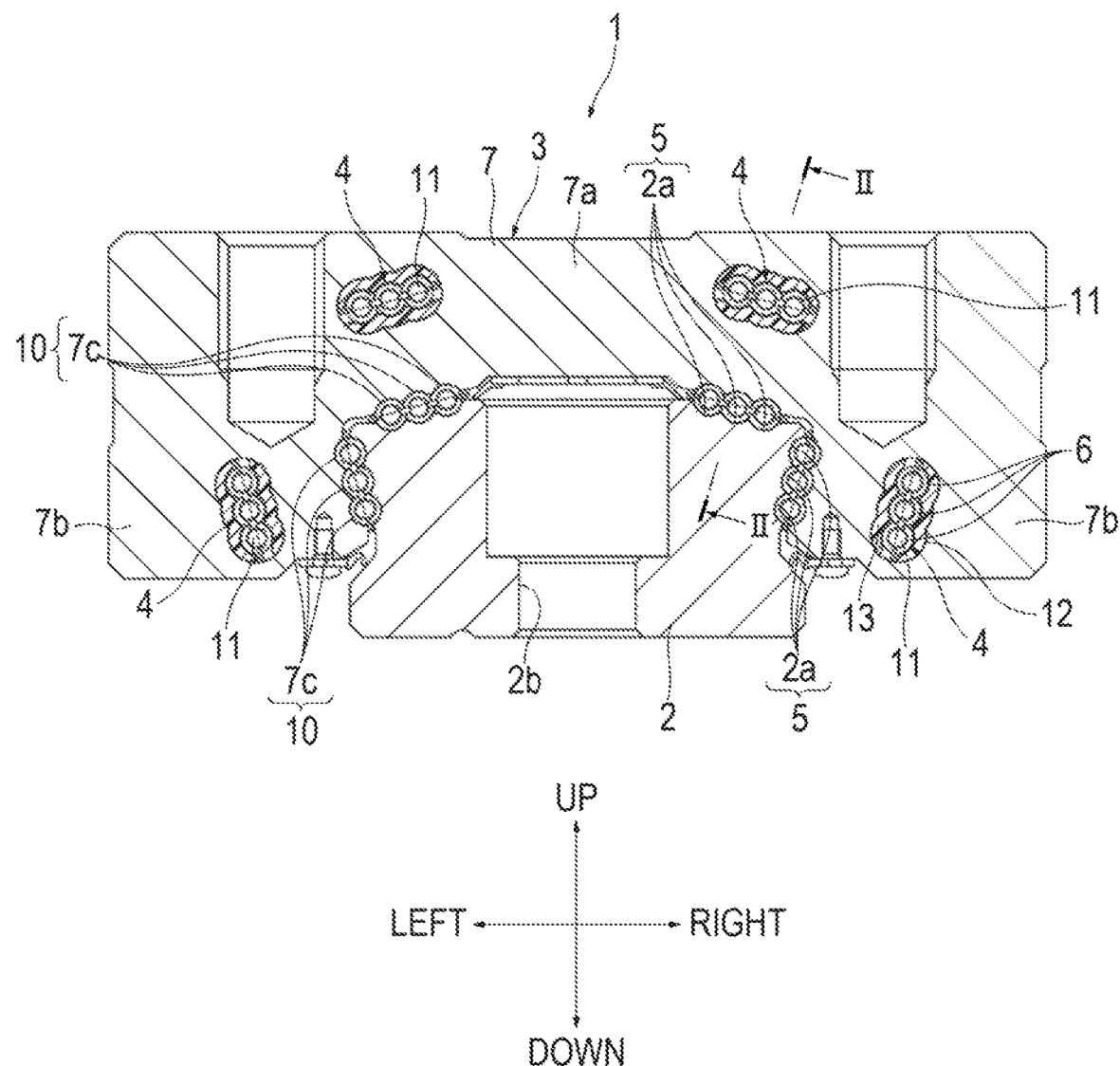
FIG. 1 is a cross-sectional view of a motion guide apparatus of a first embodiment of the present invention.
Figure 2:
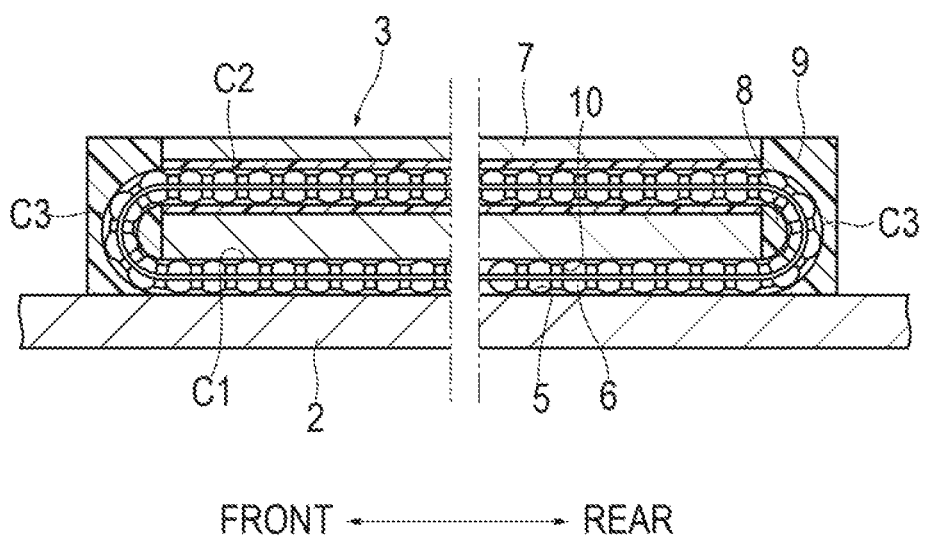
FIG. 2 is a cross-sectional view taken along line II-II of FIG. 1.

FIGS. 1 and 2 illustrate a motion guide apparatus 1 where a ball retainer 11 as a multi-row rolling element housing band of a first embodiment of the present invention is integrated. FIG. 1 is a cross-sectional view of the motion guide apparatus 1 taken along a plane orthogonal to a guide rail 2. FIG. 2 is a cross-sectional view taken along line II-II of FIG. 1.

Figure 12:
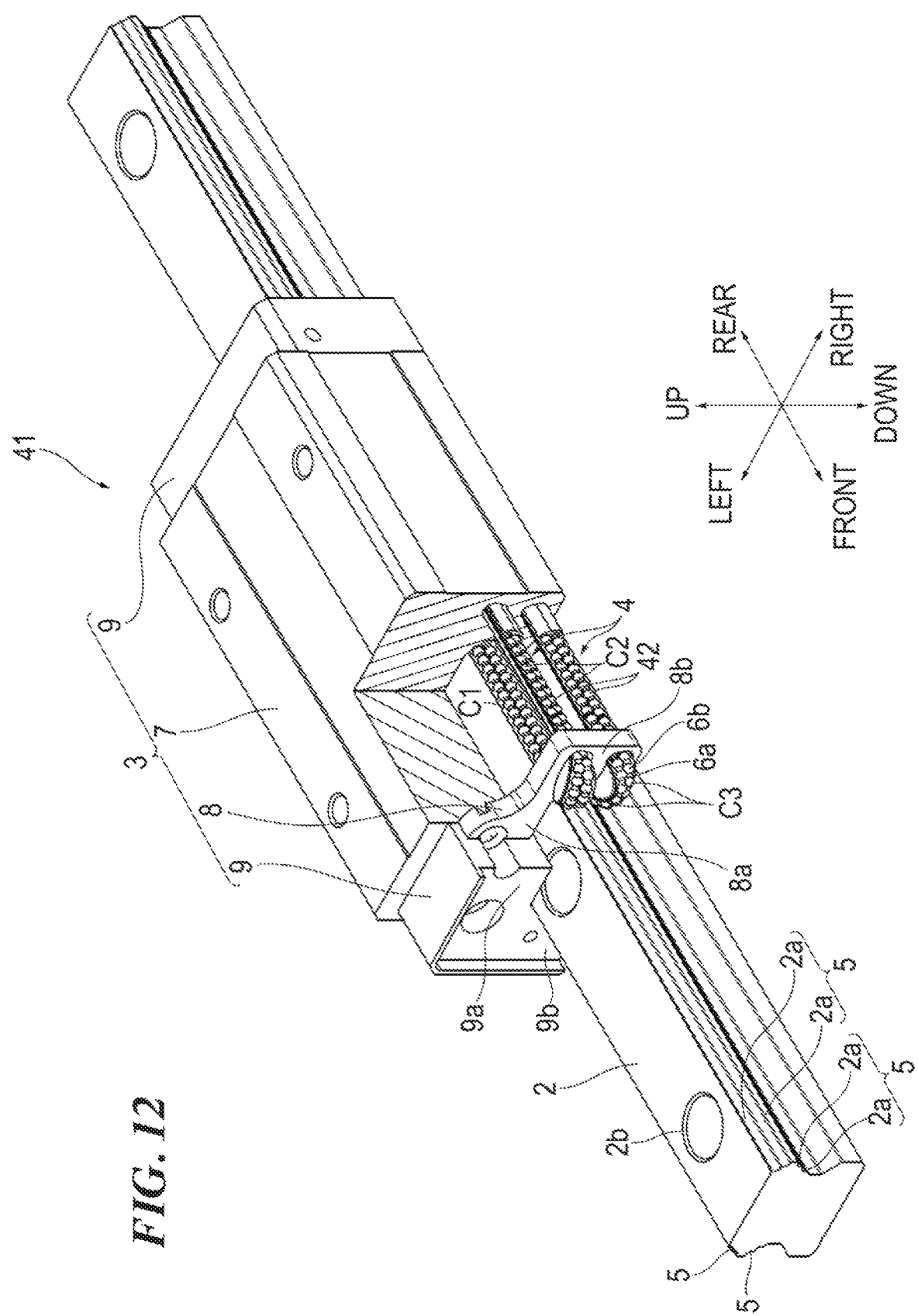
FIG. 12 is a perspective view (including a partial cross-sectional view) of a motion guide apparatus of the second embodiment of the present invention.

The motion guide apparatus 1 of the first embodiment illustrated in FIG. 1 and a motion guide apparatus 41 of a second embodiment illustrated in FIG. 12 are different in the respect whether three ball rows are provided in the ball retainer 11 or two ball rows are provided in a ball retainer 42. However, the basic structures of the guide rail 2 and a carriage 3 are substantially the same. Upon describing the motion guide apparatus 1 of the first embodiment of FIG. 1, the description is given with reference also to FIG. 12. Moreover, for convenience of description, the configuration of the motion guide apparatus 1 is described, using directions of when the motion guide apparatus 1 is placed on a horizontal plane and is viewed from the front, that is, up and down, left and right, and front and rear in FIGS. 1 and 12. Naturally, the placement of the motion guide apparatus 1 is not limited to this.

As illustrated in FIG. 1, the motion guide apparatus 1 includes the guide rail 2, and the carriage 3 that is assembled to the guide rail 2 in such a manner as to be movable relative to the guide rail 2. The carriage 3 is provided on each of the left and right sides with two upper and lower track-shaped circulation paths 4 (refer to FIG. 12). The ball retainer 11 is housed in each circulation path 4.

The guide rail 2 is long in the front-and-rear direction. A total of four ball rolling grooves 5 as rolling element rolling grooves are formed on the left and right sides of the guide rail 2, two upper and lower ball rolling grooves 5 on each side. The cross-sectional shape of the ball rolling groove 5 has a shape of three combined arcs 2a, 2a, and 2a. The three arcs 2a, 2a, and 2a have a slightly larger radius than the radius of a ball 6. A through-hole 2b for mounting the guide rail 2 on, for example, a base is made in the guide rail 2.

As illustrated in FIG. 2, the carriage 3 includes a carriage body 7, an inner plate 8 mounted on each end surface of the carriage body 7 in a relative movement direction thereof, and an end plate 9 mounted on each end surface of the carriage body 7 in such a manner as to cover the inner plate 8 (refer also to FIG. 12).

As illustrated in FIG. 1, the carriage body 7 has an inverted U-shape in cross-section, and includes a center portion 7a facing an upper surface of the guide rail 2, and left and right sleeve portions 7b facing side surfaces of the guide rail 2. Loaded ball rolling grooves 10 as rolling element rolling grooves facing the ball rolling grooves 5 of the guide rail 2 are formed on the sleeve portion 7b of the carriage body 7. The cross-sectional shape of the loaded ball rolling groove 10 has a shape of three combined arcs 7c, 7c, and 7c. The three arcs 7c, 7c, and 7c have a slightly larger radius than the radius of the ball 6.

As illustrated in FIG. 2, each circulation path 4 includes a linear loaded path C1, a linear return path C2 substantially parallel to the loaded path C1, and U-shaped turn paths C3 connecting the loaded path C1 and the return path C2.

The loaded path C1 is formed between the loaded ball rolling groove 10 of the carriage body 7 and the ball rolling groove 5 of the guide rail 2. As illustrated in FIG. 1, through-holes 12 of a shape of three combined arcs are formed parallel to the loaded ball rolling grooves 10 in the sleeve portions 7b of the carriage body 7. The return path C2 is formed in the through-hole 12. A return path constituent member 13 adjusted to the shape of the through-hole 12 is inserted into the through-hole 12. The cross-sectional shape of the return path C2 is based on three circles having a slightly larger diameter than the diameter of the ball 6 and overlapping each other.

As illustrated in FIG. 2, the turn path C3 is formed between the inner plate 8 and the end plate 9. The inner plate 8 has an inverted U-shape in front view, and includes a center portion 8a facing the upper surface of the guide rail 2 and a pair of left and right sleeve portions 8b facing the side surfaces of the guide rail 2 (refer to FIG. 12). An inner side of the turn path C3 is formed on the sleeve portion 8b of the inner plate 8. The end plate 9 also has an inverted U-shape in front view, and includes a center portion 9a facing the upper surface of the guide rail 2 and a pair of left and right sleeve portions 9b facing the side surfaces of the guide rail 2 (refer to FIG. 12). An outer side of the turn path C3 is formed on the end plate 9.

FIGS. 3A to 3D illustrate four orthogonal views of the ball retainer 11 of the embodiment. FIG. 3A is a plan view, FIG. 3D is a front view, FIG. 3C is a bottom view, and FIG. 3D is a left side view. The rear view is the same as the front view. The right side view is the same as the left side view. In the following description of the ball retainer 11, the configuration of the ball retainer 11 is described using a width direction and a length direction that are illustrated in FIG. 3A, and a thickness direction illustrated in FIG. 3B.

As illustrated in FIG. 3A, three ball rows 17, 18, and 19 are arranged in a band 15 of the ball retainer 11. The ball rows are the first ball row 17, the second ball row 18, and the third ball row 19 in order from one end to the other end in the width direction. Substantially short cylindrical spacers 20 are disposed between balls 17a, 18a, and 19a of the ball rows 17, 18, and 19. The ball pitch of each of the ball rows 17, 18, and 19 is maintained constant. A concave spherical portion that fits the shape of the first to third balls 17a, 18a, and 19a is formed on each end portion of the spacer 20. The diameter of the first ball 17a of the first ball row 17, the diameter of the second ball 18a of the second ball row 18, and the diameter of the third ball 19a of the third ball row 19 are equal to each other. The ball pitch of the first ball row 17, the ball pitch of the second ball row 18, and the ball pitch of the third ball row 19 are also equal to each other.

As illustrated in FIG. 3A, each second ball 18a of the second ball row 18 is displaced in the length direction of the band 15 from each first ball 17a of the first ball row 17. Each third ball 19a of the third ball row 19 is displaced in the length direction of the band 15 from each first ball 17a and each second ball 18a. In other words, the positions of the first ball 17a, the second ball 18a, and the third ball 19a that are closest are displaced from each other in the length direction of the band 15 in the length direction.

Figure 5:
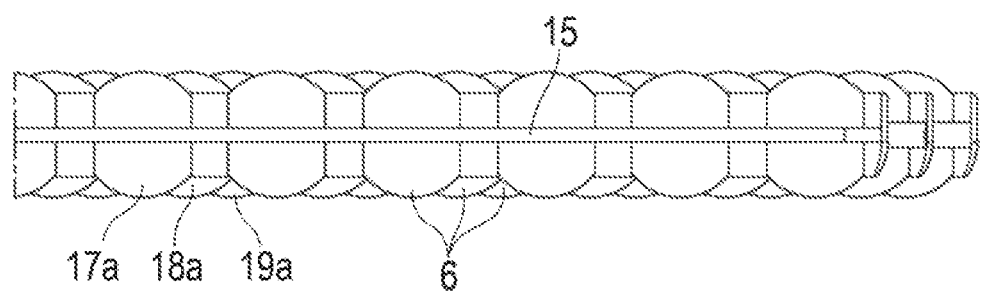
FIG. 5 is an enlarged front view of the ball retainer of the embodiment.

As illustrated in FIG. 3B, each first ball 17a, each second ball 18a, and each third ball 19a do not overlap completely as viewed in the width direction (that is, as viewed from the front) (refer also to FIG. 5). However, part of each first ball 17a, part of each second ball 18a, and part of each third ball 19a overlap each other.

As illustrated in FIG. 3A, the band 15 is formed into a horizontal rectangular shape in plan view. Three circular opening portion rows 15a, 15b, and 15c for housing the three ball rows 17, 18, and 19 are formed in the band 15. Three spacer rows 20a, 20b, and 20c are provided between the opening portions of the three opening portion rows 15a, 15b, and 15c. Each second spacer 20 of the second spacer row 20b is displaced in the length direction of the band 15 from each first spacer 20 of the first spacer row 20a. Each third spacer 20 of the third spacer row 20c is displaced in the length direction of the band 15 from each first spacer 20 of the first spacer row 20a and each second spacer 20 of the second spacer row 20b. The spacers 20 and the band 15 are integrally molded in resin. The three spacer rows 20a, 20b, and 20c are coupled in a chain by the band 15. The band 15 has flexibility to enable circulation along the track-shaped circulation path 4.

The band 15 is divided by the three ball rows 17, 18, and 19 and the three spacer rows 20a, 20b, and 20c into four, that is, a side band 21 protruding outward in the width direction from the first ball row 17, a wavy first middle band 22 between the first ball row 17 and the second ball row 18, a wavy second middle band 23 between the second ball row 18 and the third ball row 19, and a side band 24 protruding outward in the width direction from the third ball row 19. The first ball 17a and the second ball 18a are made noncontact by the first middle band 22. The second ball 18a and the third ball 19a are made noncontact by the second middle band 23. The spacing between the first ball row 17 and the second ball row 18 is equal to the spacing between the second ball row 18 and the third ball row 19.

Both end portions of the band 15 in the length direction are formed stepwise. One or more ball retainers 11 are integrated into the circulation path 4. When both end portions of one ball retainer 11 are joined, or when adjacent ball retainers 11 are joined, both stepwise end portions of the band 15 are formed complementary to each other so that the ball pitch of the first ball row 17, the ball pitch of the second ball row 18, and the ball pitch of the third ball row 19 are made substantially constant even at the joint.

Figure 4:
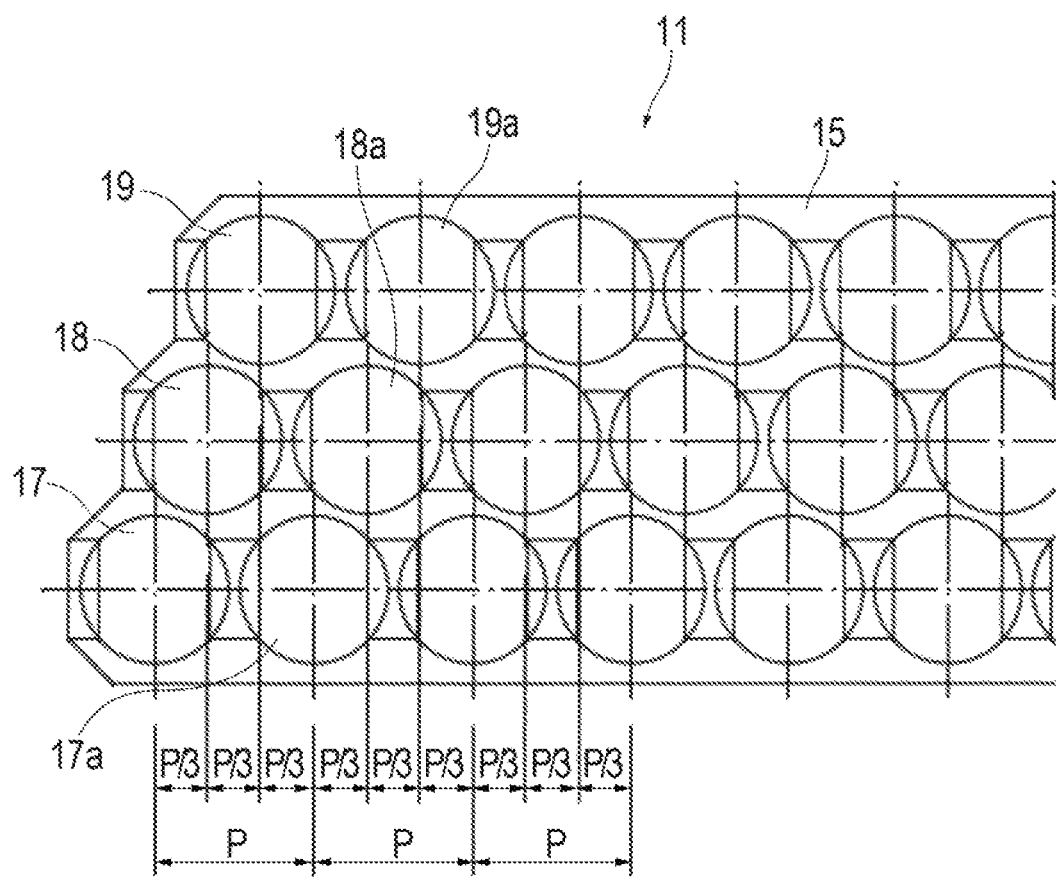
FIG. 4 is an enlarged plan view of the ball retainer of the embodiment.

FIG. 4 illustrates an enlarged plan view of the ball retainer 11. Each second ball 18a is displaced by P/3 from each first ball 17a in the length direction of the band 15 (more specifically, one direction in the length direction, that is, the right direction in FIG. 4). P is the ball pitch of the first ball row 17. Similarly, each third ball 19a is displaced by P/3 from each second ball 18a in the length direction of the band 15. Hence, as illustrated in a front view of FIG. 5, there are no balls 6 overlapping completely as viewed in the width direction, and the first ball 17a, the second ball 18a, and the third ball 19a appear in due order in the length direction of the band 15 in a cycle of P/3.

Each second ball 18a is displaced in the length direction from each first ball 17a. Each third ball 19a is displaced from each second ball 18a. Accordingly, the waving of the carriage 3 can be reduced. The reason for this is described below. Waving indicates that, since the relative positions of the carriage 3 and the balls 6 change when the carriage 3 performs strokes, the number of effective balls and the balance of forces change in the carriage 3 with the change of the relative positions to cause a subtle displacement in a radial direction and tilt in a pitch direction.

Figure 6:
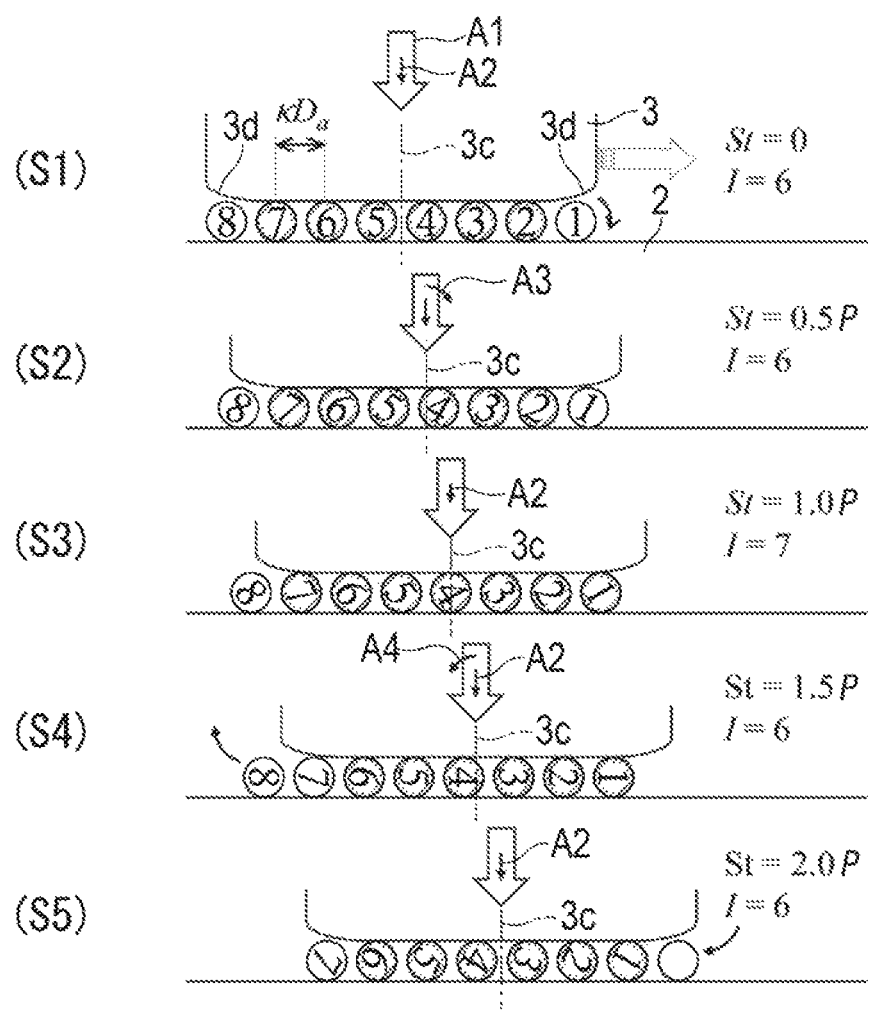
FIG. 6 is a diagram explaining the principle of occurrence of waving.

FIG. 6 is a diagram explaining the principle of occurrence of waving. The reference sign 2 denotes the guide rail, the reference sign 3 denotes the carriage, and reference signs 1 to 8 denote balls rolling in the loaded path between the guide rail 2 and the carriage 3. St is the amount of stroke of the carriage 3. I is the number of effective balls. P is the ball pitch. An open arrow A1 is a load acting on the carriage 3. An arrow A2 is the displacement of the carriage 3 in the radial direction. An arrow A3 is the tilt of the carriage 3 in the pitch direction (clockwise direction). An arrow A4 is the tilt of the carriage 3 in the pitch direction (counterclockwise direction).

S1 to S5 illustrate states of when the carriage 3 performs a rightward stroke. St on the right of the carriage 3 represents the amount of stroke of the carriage 3. I represents the number of effective balls. The balls 1 to 8 also move to the right, while rolling, with the movement of the carriage 3 to the right. The amount of movement of the balls 1 to 8 is half the amount of movement of the carriage 3.

When in S1 where St=0, there are four balls on each of the left and right with respect to a center 3c of the carriage 3. The hatched balls 2 to 7 of the balls 1 to 8 are effective balls under the load acting on the carriage 3. There are effective balls 2 to 4 and 5 to 7 under the load, which are equal in number, three here, on the left and right with respect to the center 3c of the carriage 3, respectively. Accordingly, the carriage 3 does not tilt in the pitch direction. However, if the load is imposed on the effective balls 2 to 7, the effective balls 2 to 7 are compressed, and the carriage 3 is displaced downward in the radial direction as indicated by the arrow A2. A crowning 3d is provided to each end portion of the carriage 3. The balls 1 and 8 are not under the load.

When in S2 where St=0.5 P, the effective balls 2 to 7 are under the load acting on the carriage 3 as in S1. Accordingly, the carriage 3 stays displaced downward in the radial direction. When in S2, the effective balls 5 to 7 on the left with respect to the center 3c of the carriage 3 move slightly away from the center of the carriage 3 as compared to the effective balls 2 to 4 on the right with respect to the center of the carriage 3. Hence, the moment balance due to the counterforce of the effective balls 2 to 7 is lost. The carriage 3 tilts slightly in the pitch direction (clockwise direction) as indicated by the arrow A3.

When in S3 where St=1.0 P, the ball 1 becomes the effective ball. The number of effective balls, I, becomes seven. The number of effective balls, I, is increased from six to seven. Accordingly, the downward displacement of the carriage 3 in the radial direction is reduced as indicated by the arrow A2. There are the effective balls 1 to 7 symmetrically left and right with respect to the center 3c of the carriage 3. Accordingly, the carriage 3 does not tilt in the pitch direction.

When in S4 where St=1.5 P, the ball 7 that has been the effective ball becomes the ball 7 that is not under the load, and the number of effective balls, I, becomes six. Hence, the downward displacement of the carriage 3 in the radial direction is increased as compared to in S3 as indicated by the arrow A2. At this point in time, the effective balls 1 to 3 on the right with respect to the center 3c of the carriage 3 move slightly away from the center of the carriage 3 as compared to the effective balls 4 to 6 on the left with respect to the center 3c of the carriage 3. The moment balance due to the counterforce of the effective balls 1 to 6 is lost. The carriage 3 tilts slightly in the pitch direction (counterclockwise direction) as indicated by the arrow A4.

When in S5 where St=2.0 P, the carriage 3 returns to the initial state of S1. In this manner, the carriage 3 repeats a subtle displacement in the radial direction and tilt in the pitch direction in a cycle of 2 kDa.

The more effective balls there are, the smaller a displacement in the radial direction and a tilt in the pitch direction of the carriage 3 are. For example, they are smaller if the number of effective balls changes from 18 to 19 than if the number of effective balls changes from six to seven. As in the embodiment, the three ball rows 17, 18, and 19 are placed in the loaded path, each second ball 18a is displaced in the length direction from each first ball 17a, and each third ball 19a is displaced from each second ball 18a. Accordingly, it can be deemed as if the number of effective balls contributing to a reduction in waving has increased although the length of the loaded path C1 is the same. Therefore, it is possible to promote a reduction in waving, and by extension an increase in the degree of precision of the guide of the motion guide apparatus 1.

Moreover, when the number of the ball rows 17, 18, and 19 is three, each second ball 18a is displaced by P/3 in the length direction from each first ball 17a, and each third ball 19a is displaced by P/3 from each second ball 18a. Accordingly, the first ball 17a, the second ball 18a, and the third ball 19a appear in the loaded path C1 at the same pitch without overlapping each other, and enter the loaded path C1 at the same pitch. Hence, waving can be further reduced. Similarly, if the number of ball rows is n, the ball rows are displaced by P/n to enable a further reduction in waving.

Furthermore, the ball pitch of the first ball row 17, the ball pitch of the second ball row 18, and the ball pitch of the third ball row 19 are made equal. Accordingly, the first ball 17a, the second ball 18a, and the third ball 19a appear at the same pitch without overlapping each other across the entire length of the loaded path C1. Hence, waving can be further reduced.

The first ball row 17, the second ball row 18, and the third ball row 19 are placed in due order in the width direction of the band 15. Accordingly, a distal end portion of the band 15 bends gradually from one end portion (a lower end portion of FIG. 4) toward the other end portion (an upper end portion of FIG. 4) in the width direction in the U-shaped turn path C3. Hence, the band 15 can be smoothly bent in the turn path C3.

The carriage 3 of the motion guide apparatus 1 is provided with four loaded paths C1 to receive loads in the up-and-down direction and in the left-and-right direction. The three ball rows 17, 18, and 19 are placed in each loaded path C1, and each of the balls 17a, 18a, and 19a is displaced as described above. Accordingly, it is possible to deem that many balls with a small diameter are placed in each loaded path C1, and to achieve compatibility between increases in the degree of precision and rigidity of the guide of the motion guide apparatus 1.

Figure 7A:
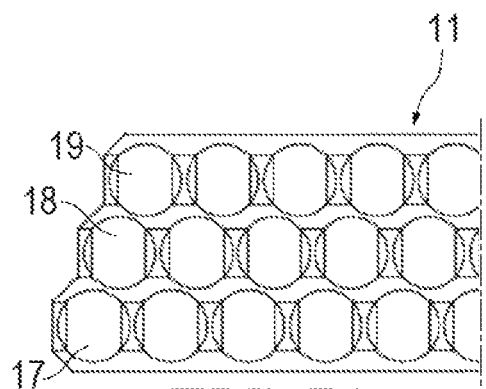
FIGS. 7A to 7F are plan views of modifications of the ball retainer of the embodiment.
Figure 7B:
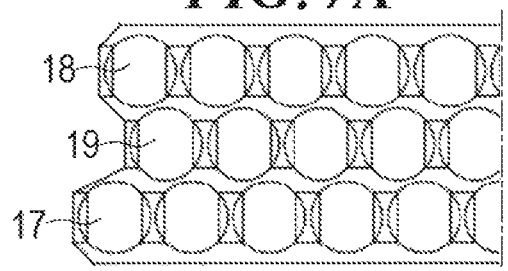
Figure 7C:
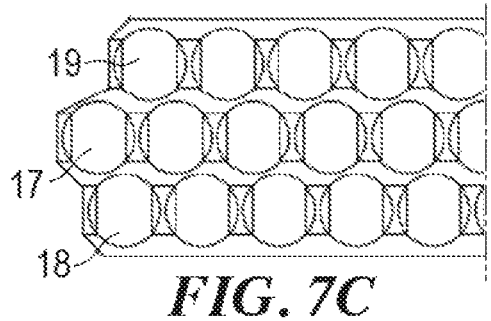
Figure 7D:
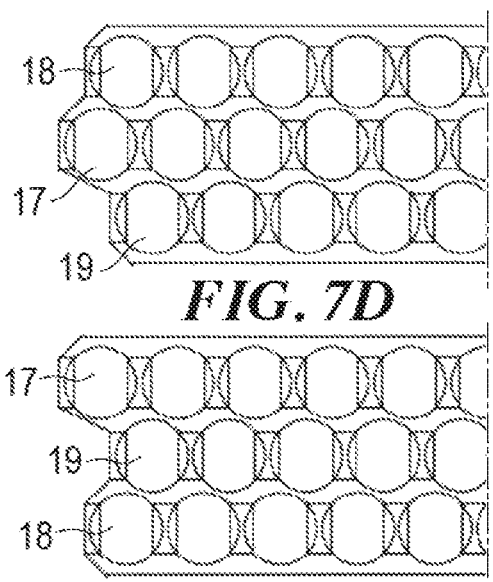
Figure 7E:
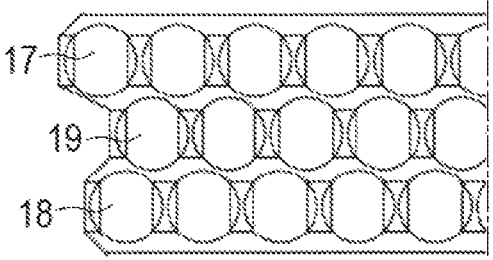
Figure 7F:
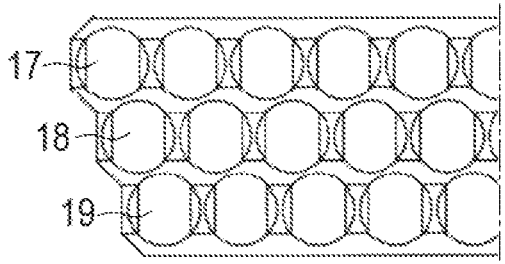

FIGS. 7A to 7F illustrate modifications of the ball retainer 11 of the first embodiment. In the first embodiment, as illustrated in FIG. 7A, the first to third ball rows 17, 18, and 19 are placed in order from one end portion (a lower end portion in FIG. 7A) to the other end portion (an upper end portion in FIG. 7A) of the ball retainer 11 in the width direction. They can also be placed in the order of the first ball row 17, the third ball row 19, and the second ball row 18 as illustrated in FIG. 7B. They can also be placed in the order of the second ball row 18, the first ball row 17, and the third ball row 19 as illustrated in FIG. 7C. They can also be placed in the order of the third ball row 19, the first ball row 17, and the second ball row 18 as illustrated in FIG. 7D. They can also be placed in the order of the second ball row 18, the third ball row 19, and the first ball row 17 as illustrated in FIG. 7E. They can also be placed in the order of the third ball row 19, the second ball row 18, and the first ball row 17 as illustrated in FIG. 7F. In any case, each second ball 18a is displaced by P/3 in the length direction from each first ball 17a, and each third ball 19a is displaced by P/3 in the length direction from each second ball 18a. If the front and back of the ball retainer 11 are distinguished, the number of placement patterns of the first to third ball rows 17, 18, and 19 is 3!. If the front and back of the ball retainer 11 are not distinguished, the number of placement patterns of the first to third ball rows 17, 18, and 19 is 3!/2.

(Ball Retainer of Second Embodiment)

Figure 8A:
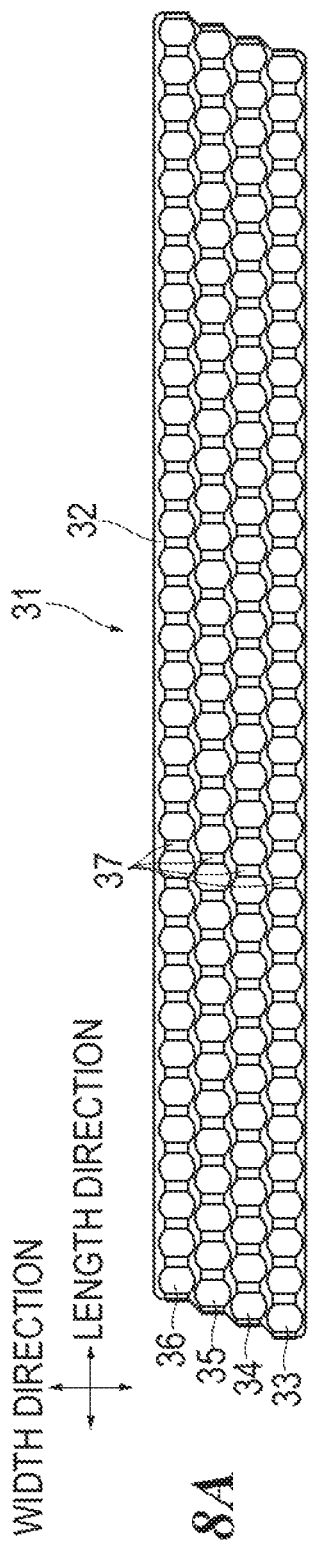
FIGS. 8A to 8D are four orthogonal views of a ball retainer of a second embodiment of the present invention (FIG. 8A is a plan view, FIG. 8B is a front view, FIG. 8C is a bottom view, and FIG. 8D is a left side view).
Figure 8B:
Figure 8C:
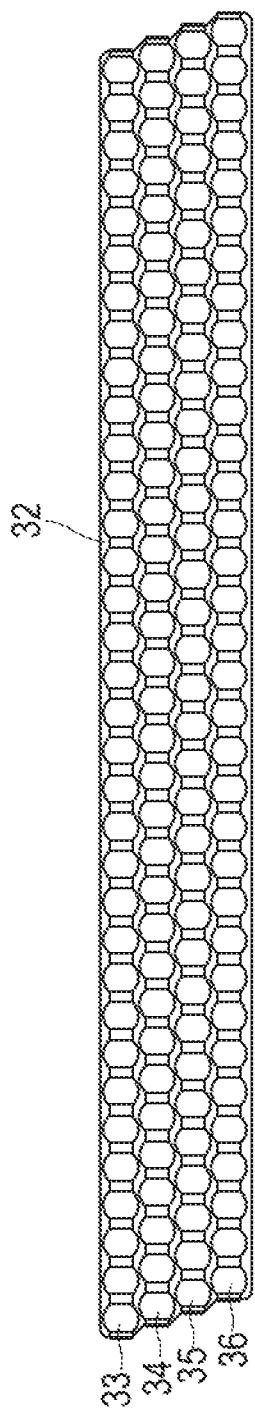
Figure 8D:

FIGS. 8A to 8D illustrate a ball retainer 31 of the second embodiment of the present invention. In the embodiment, as illustrated in FIG. 8A, four ball rows 33 to 36 are arranged in a band 32 of the ball retainer 31. The four ball rows 33 to 36 are the first ball row 33, the second ball row 34, the third ball row 35, and the fourth ball row 36 in order from one end to the other end in the width direction. Adjacent ball rows 33 to 36 are all equal distance to each other in the width direction. A spacer 37 is disposed between balls of each of the ball rows 33 to 36. The ball pitch of each of the ball rows 33 to 36 is maintained constant. Both end portions of the band 32 are formed stepwise in four stages in such a manner as to be complementary to each other.

Figure 9:
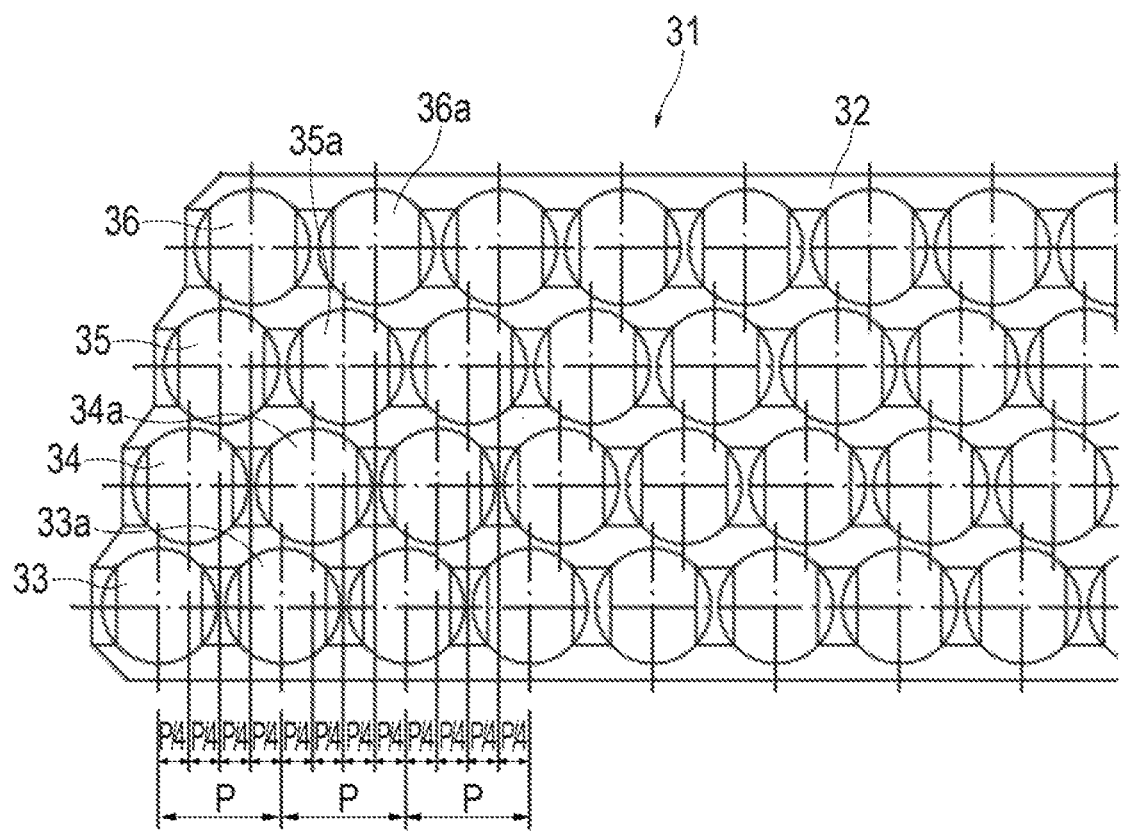
FIG. 9 is an enlarged plan view of the hall retainer of the embodiment.
Figure 10:
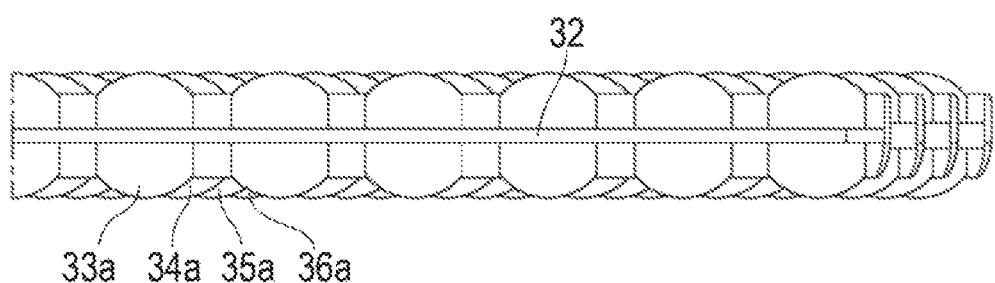
FIG. 10 is an enlarged front view of the ball retainer of the embodiment.

FIG. 9 illustrates an enlarged plan view of the ball retainer 31. Each second ball 34a is displaced by P/4 in the length direction of the band 32 from each first ball 33a. P is the ball pitch of the first ball row 33. Similarly, each third ball 35a is displaced by P/4 in the length direction of the band 32 from each second ball 34a, and each fourth ball 36a is displaced P/4 in the length direction of the band 32 from each third ball 35a. Hence, as illustrated in FIG. 10, as viewed in the width direction, there are no balls overlapping completely, and the first ball 33a, the second ball 34a, the third ball 35a, and the fourth ball 36a appear in due order in the length direction of the band 32 in a cycle of P/4. The four ball rows 33 to 36 are placed in this manner. Accordingly, the number of effective balls can be increased to 4/3 times as compared to the case where the three ball rows 17 to 19 are placed, and waving can be further reduced.

Figure 11:
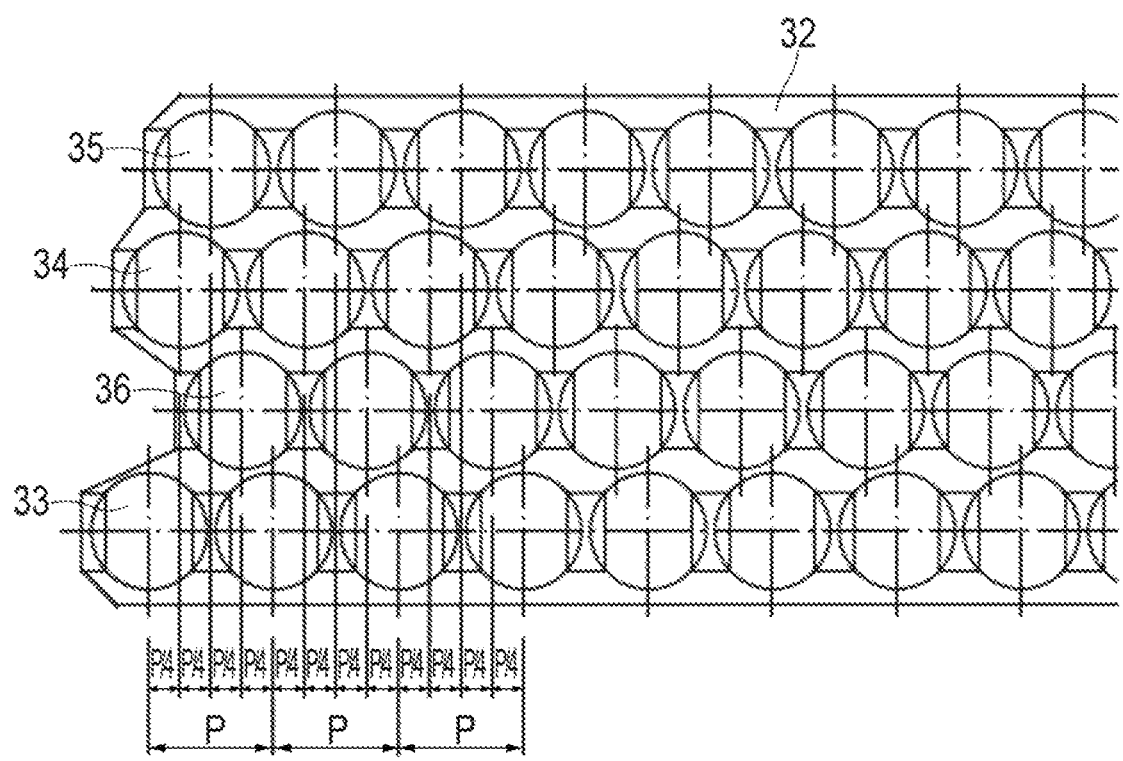
FIG. 11 is a plan view of a modification of the ball retainer of the embodiment.

FIG. 11 illustrates a modification of the ball retainer 31 of the second embodiment. The placement of the first to fourth ball rows 33 to 36 is not limited to the one illustrated in FIG. 9. FIG. 11 illustrates an example where the first ball row 33, the fourth ball row 36, the second ball row 34, and the third ball row 35 are placed from one end to the other end of the ball retainer 31 in the width direction. If the front and back of the ball retainer 31 are distinguished, the number of placement patterns of the first to fourth ball rows 33 to 36 are 4!. If the front and back of the ball retainer 31 are not distinguished, the number of placement patterns of the first to fourth ball rows 33 to 36 are 4!/2.

(Motion Guide Apparatus of Second Embodiment)

FIG. 12 illustrates the motion guide apparatus 41 of the second embodiment of the present invention. The basic structure of the motion guide apparatus 41 of the second embodiment is the same as that of the motion guide apparatus 1 of the first embodiment. Accordingly, the same reference signs are assigned to them, and their descriptions are omitted. Four circulation paths 4 in total are also provided to the motion guide apparatus 41 of the second embodiment. The ball retainer 42 where two ball rows are arranged is inserted into each circulation path 4.

Figure 13A:
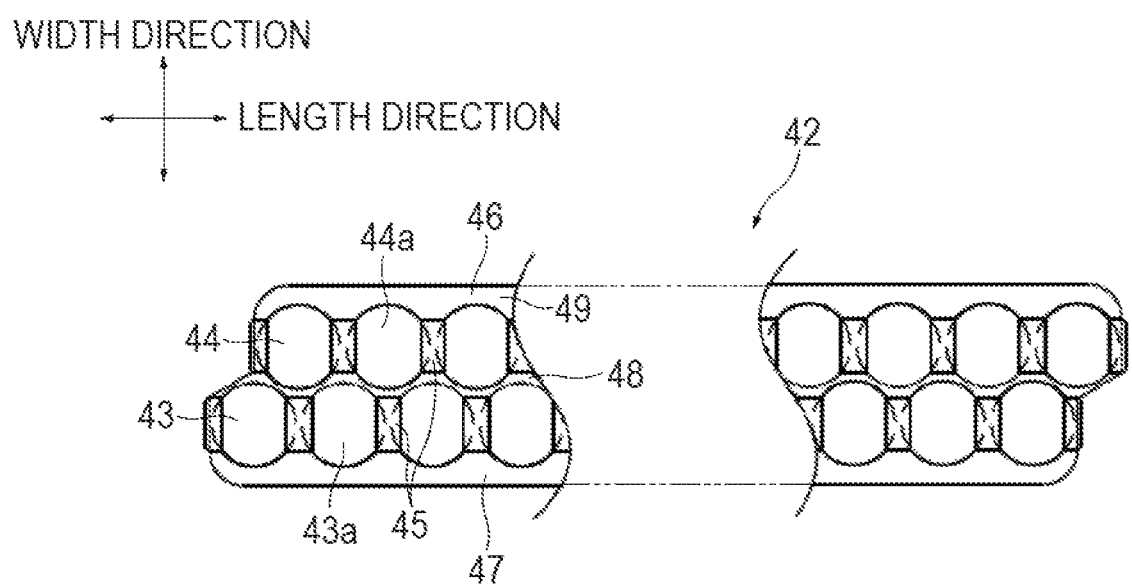
FIGS. 13A and 13B are diagrams illustrating a retainer integrated into the motion guide apparatus of the embodiment (FIG. 13A is a plan view, and FIG. 13B is a front view).
Figure 13B:
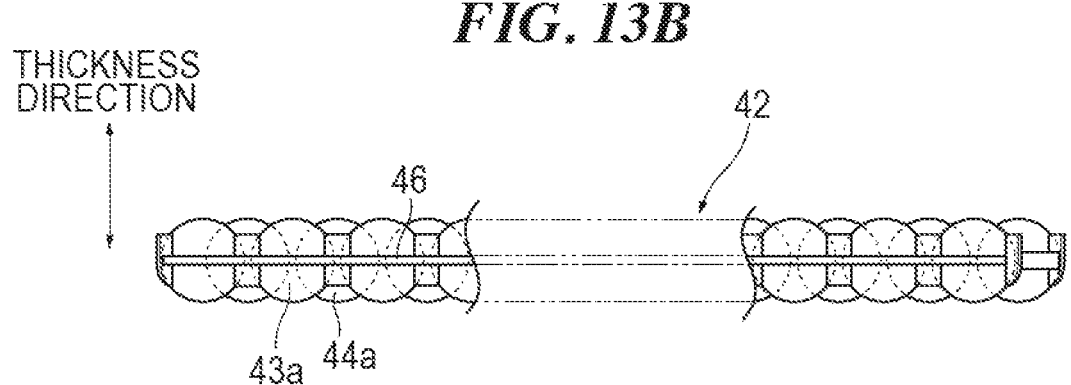

FIGS. 13A and 13B illustrate the ball retainer 42. As illustrated in the plan view of FIG. 13A, spacers 45 are disposed between first balls 43a of a first ball row 43. The ball pitch of the first ball row 43 is maintained constant. The spacer 45 is also disposed between second balls 44a of a second ball row 44. The ball pitch of the second ball row 44 is maintained constant. The diameter of the first ball 43a is equal to the diameter of the second ball 14a. The ball pitch of the first ball row 43 is equal to the ball pitch of the second ball row 44.

A band 46 is divided by two ball rows 43 and 44 into three, that is, a side band 47 protruding outward in the width direction from the first ball row 43, a wavy middle band 48 between the first ball row 43 and the second ball row 44, and a side band 49 protruding outward in the width direction from the second ball row 44. The first ball 43a and the second ball 44a are made noncontact by the middle band 48.

Each second ball 44a is displaced by P/2 in the length direction of the band 46 from each first ball 43a. P is the ball pitch of the first ball row 43. As illustrated in FIG. 13B, as viewed in the width direction, there are no balls overlapping completely, and the first ball 43a and the second ball 44a appear in due order in the length direction of the band 46 in a cycle of P/2. In this manner, each second ball 44a is displaced in the length direction of the band 46 from each first ball 43a to enable a reduction in waving.

Moreover, the spacer 45 is disposed between the first balls 43a. The spacer 45 is disposed between the second balls 44a. The first ball 43a and the second ball 44a are made noncontact by the middle band 48. Accordingly, the amount of displacement of each second ball 44a from each first ball 43a can be maintained constant, and also the first balls 43a and the second balls 44a can be smoothly circulated.

Examples

As illustrated in FIG. 11 FIGS. 14A to 14C, a waving analysis of a case where three ball rows were arranged in a ball retainer was carried out. FIG. 14A illustrates a first comparative example of when each first ball 17a', each second ball 18a', and each third ball 19a' were arranged side by side. In the case of the first comparative example, each first ball 17a', each second ball 18a', and each third ball 19a' overlap completely as viewed in the width direction of a ball retainer 11'. FIG. 14B illustrates a second comparative example where each first ball 17a" and each second ball 18a" were displaced by P/2 in the length direction, and each second ball 18a" and each third ball 19a" were displaced by P/2 in the length direction. In this case, the position of each first ball 17a" in the length direction agrees with the position of each third ball 19a" in the length direction. FIG. 14C illustrates an example of the present invention where each first ball 17a and each second ball 18a were displaced by P/3 in the length direction, and each second ball 18a and each third ball 19a were displaced by P/3 in the length direction.

The analysis conditions are illustrated in table 1. In the first comparative example, the second comparative example, and the present invention example, the analysis conditions were made common as illustrated in table 1.

TABLE 1

|  | Contact Angle (°) | Ball Diameter (mm) | Carriage Metal Portion Length (mm) | Number of Effective Balls (Zt) | Groove Conformity | Applied Load |
|---|---|---|---|---|---|---|
| First Comparative Example | 45 | 2.381 | 158.1 | 61 | 0.515 | 0.25C |
| Second Comparative Example |  |  |  |  |  |  |
| Present Invention Example |  |  |  |  |  |  |

Figure 15A:
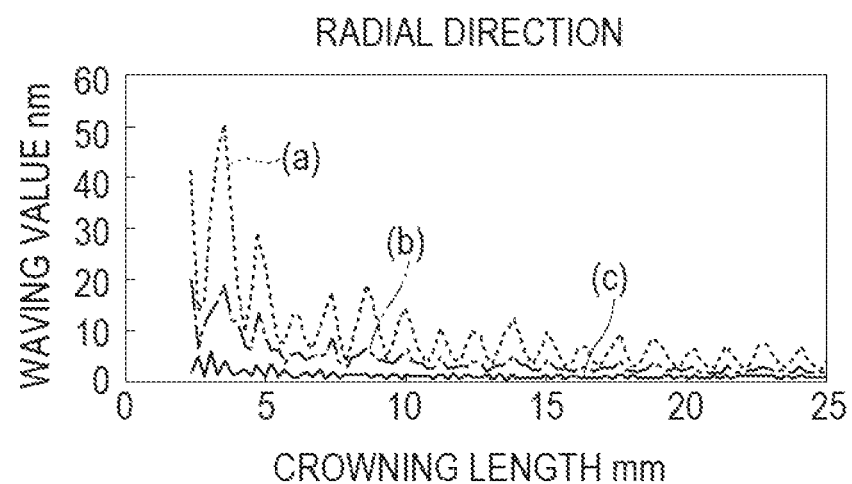
FIGS. 15A and 15B are graphs illustrating waving analysis results (FIG. 15A illustrates waving in a radial direction, and FIG. 15B illustrates waving in a pitch direction).
Figure 15B:
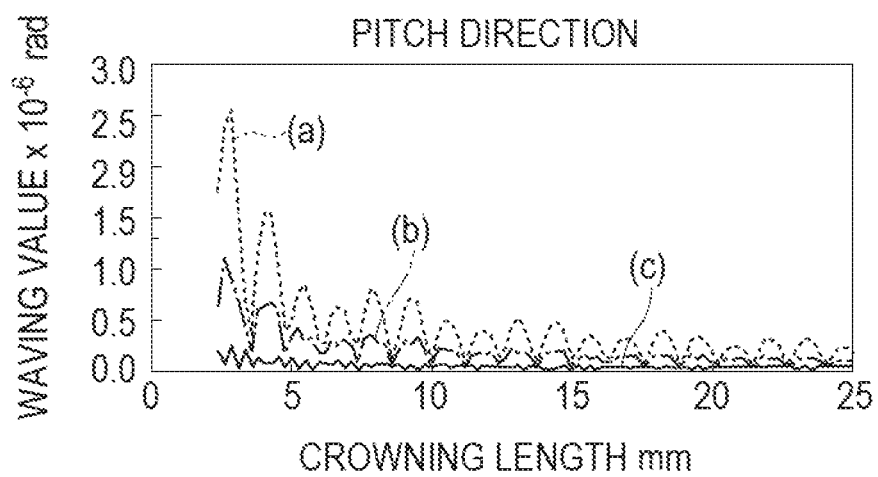

FIGS. 15A and 15B are graphs illustrating the results of the analysis of waving in the radial direction and in the pitch direction. The horizontal axis of the graph is a crowning length. The waving values obtained by changing the crowning length continuously were rendered in graph form.

It was found that the waving value could be reduced to approximately ⅐ in the present invention example indicated by (c) in the graph as compared to the first comparative example indicated by (a) in the graph, and the waving value could also be reduced to approximately ¼ as, compared to the second comparative example indicated by (b) in the graph. The waving value was reduced in the second comparative example as compared to in the first comparative example. This is because, in the second comparative example, each first ball 17a" and each second ball 18a" were displaced from each other and it could be deemed that the number of effective balls had been doubled. In the present invention example, each first ball 17a, each second ball 18a, and each third ball 19a were displaced from each other. Accordingly, it could be deemed that the number of effective balls had been trebled, and the waving value could be further reduced to approximately ¼ as compared to in the second comparative example. The unit of the vertical axis of FIGS. 15A and 15B is nm. It is revolutionary to be able to substantially eliminate the waving value in any crowning length as in the present invention example.

The present invention is not limited to the above embodiments, and can be modified in various manners within the scope that does not change the gist of the present invention.

In the above embodiments, across the entire length of the ball retainer, each second ball is displaced in the length direction from each first ball, and each third ball is displaced in the length direction from each second ball, but they can also be displaced as described above in a part of the ball retainer in the length direction. If they are displaced as described above in a part of the ball retainer in the length direction, even when the positions of the first to third balls agree with each other in the other part of the ball retainer in the length direction (for example, an end portion of the ball retainer in the length direction, or a center portion of the ball retainer in the length direction), the waving of the carriage 3 can be reduced.

In the above embodiments, each second ball is displaced by P/n in the length direction from each first ball, and each third ball is displaced by P/n from each second ball. However, the amount of displacement is not limited to this. As long as each second ball is displaced in the length direction from each first ball, and each third ball is displaced in the length direction from each first ball and each second ball, the waving of the carriage can be reduced.

In the above embodiments, the diameter of the first ball, the diameter of the second ball, and the diameter of the third ball are equal to each other, and the ball pitch of the first ball row, the ball pitch of the second ball row, and the ball pitch of the third ball row are equal to each other. However, it is also possible to make different at least one of the diameter of the first ball, the diameter of the second ball, and the diameter of the third ball. Moreover, it is also possible to make different at least one of the ball pitch of the first ball row, the ball pitch of the second ball row, and the ball pitch of the third ball row. If at least one of the ball pitches is made different, it is desired that the least common multiple of the ball pitch of the first ball row, the ball pitch of the second ball row, and the ball pitch of the third ball row be equal to or greater than the entire length of the ball retainer. This is because the positions of the first to third balls in the length direction are prevented from agreeing with each other.

In the above embodiments, the first ball, the second ball, the third ball appear in order from one end to the other end of the ball retainer in the length direction. However, for example, it is also possible to eliminate the second ball at the left end of the ball retainer 11 of FIG. 3A, place the second ball at the right end of the ball retainer 11, eliminate the third ball at the left end of the ball retainer 11, and place the third ball at the right end of the ball retainer 11. Consequently, the gradients at both stepwise end portions of the band 15 become steeper, and it becomes easy to bend the band 15 in the U-shaped turn path C3.

In the above embodiments, the description has been given of the case of using balls as rolling elements. However, a roller can also be used as a rolling element.

The description is based on Japanese Patent Application No. 2017-101423 filed on May 23, 2017, the entire contents of which are incorporated herein.

REFERENCE SIGNS LIST

1 Motion guide apparatus
4 Circulation path
2 Guide rail
3 Carriage
11, 31 Ball retainer (multi-row rolling element housing band)
15, 32 Band
17 to 19, 33 to 36 At least three ball rows (at least three rolling element rows)
17, 33 First ball row (first rolling element row)
18, 34 Second ball row (second rolling element row)
19, 35 Third ball row (third rolling element row)
20, 37 Spacer
36 Fourth ball row (fourth rolling element row)
17a, 33a Each first ball (each first rolling element)
18a, 34a Each second ball (each second rolling element)
19a, 35a Each third ball (each third rolling element)
36a Each fourth ball (each fourth rolling element)
P First ball pitch (first rolling element pitch)
41 Motion guide apparatus
42 Ball retainer (multi-row rolling element housing band)
43 to 44 Two ball rows (two rolling element rows)
43 First ball row (first rolling element row)
44 Second ball row (second rolling element row)
43a Each first ball (each first rolling element)
44a Each second ball (each second rolling element)
45 Spacer

The invention claimed is:

1. A multi-row rolling element housing band, wherein
at least three rolling element rows are arranged in a band, and
in at least a part of the band in a length direction thereof, second rolling elements of a second rolling element row is displaced by approximately P/n in the length direction of the band from first rolling elements of a first rolling element row, third rolling elements of a third rolling element row is displaced by approximately P/n in the length direction from the second rolling elements, the third rolling elements are displaced by approximately 2P/n in the length direction from the first rolling elements, and
P is a first rolling element pitch of the first rolling element row, and n is the number of more than three of the rolling element rows.

2. The multi-row rolling element housing band according to claim 1, wherein the first rolling element pitch of the first rolling element row, a second rolling element pitch of the second rolling element row, and a third rolling element pitch of the third rolling element row are substantially equal to each other.

3. The multi-row rolling element housing band according to claim 2, wherein the first rolling element row, the second rolling element row, and the third rolling element row are placed in order in a width direction of the band.

4. The multi-row rolling element housing band according to claim 3, wherein the number of the rolling element rows is three or four.

5. A motion guide apparatus comprising:
a guide rail;
a carriage assembled to the guide rail in such a manner as to be movable relative to the guide rail; and
a multi-row rolling element housing band according to claim 4 integrated into a circulation path of the carriage, wherein
as viewed from a front of the carriage in a state where the motion guide apparatus is placed on a horizontal plane, the carriage is provided with four circulation paths in total, that is, an upper circulation path and a lower circulation path on each of the left and right sides, and
the multi-row rolling element housing band is integrated into each circulation path.

6. A motion guide apparatus comprising:
a guide rail;
a carriage assembled to the guide rail in such a manner as to be movable relative to the guide rail; and
a multi-row rolling element housing band according to claim 3 integrated into a circulation path of the carriage, wherein
as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

7. The multi-row rolling element housing band according to claim 2, wherein the number of the rolling element rows is three or four.

8. A motion guide apparatus comprising:

a guide rail;

a carriage assembled to the guide rail in such a manner as to be movable relative to the guide rail; and a multi-row rolling element housing band according to claim 7 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

9. A motion guide apparatus comprising:

a guide rail;

a carriage assembled to the guide rail in such a manner as to be movable relative to the guide rail; and a multi-row rolling element housing band according to claim 2 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

10. The multi-row rolling element housing band according to claim 1, wherein the first rolling element row, the second rolling element row, and the third rolling element row are placed in order in a width direction of the band.

11. The multi-row rolling element housing band according to claim 10, wherein the number of the rolling element rows is three or four.

12. A motion guide apparatus comprising:

a guide rail;

a carriage assembled to the guide rail in such a manner as to be movable relative to the guide rail; and a multi-row rolling element housing band according to claim 11 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

13. A motion guide apparatus comprising:

a guide rail;

a carriage assembled to the guide rail in such a manner as to be movable relative to the guide rail; and a multi-row rolling element housing band according to claim 10 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

14. The multi-row rolling element housing band according to claim 1, wherein the number of the rolling element rows is three or four.

15. A motion guide apparatus comprising:

a guide rail;

a carriage assembled to the guide rail in such a manner as to be movable relative to the guide rail; and a multi-row rolling element housing band according to claim 14 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

16. A motion guide apparatus comprising:

a guide rail;

a carriage assembled to the guide rail in such a manner as to be movable relative to the guide rail; and a multi-row rolling element housing band according to claim 1 integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, and the multi-row rolling element housing band is integrated into each circulation path.

17. A motion guide apparatus comprising:

a guide rail;

a carriage assembled to the guide rail in such a manner as to be movable relative to the guide rail; and a multi-row rolling element housing band integrated into a circulation path of the carriage, wherein as viewed from a front of the carriage in a state where the motion guide apparatus is placed on a horizontal plane, the carriage is provided with four circulation paths in total, that is, an upper circulation path and a lower circulation path on each of the left and right sides, the multi-row rolling element housing band is integrated into each circulation path, two rolling element rows are arranged in the multi-row rolling element housing band, and in at least a part of the multi-row rolling element housing band in a length direction thereof, second rolling elements of a second rolling element row is displaced by approximately P/2 in the length direction of the multi-row rolling element housing band from first rolling elements of a first rolling element row in a state where a spacer is disposed between the first rolling elements, a spacer is disposed between the second rolling elements, the first and second rolling elements are made noncontact, and P is a first rolling element pitch of the first rolling element row.

* * * * *